July 20, 1926.                S. M. BIELECKI                1,593,419
                               OPTICAL DEVICE
                            Filed August 7, 1923
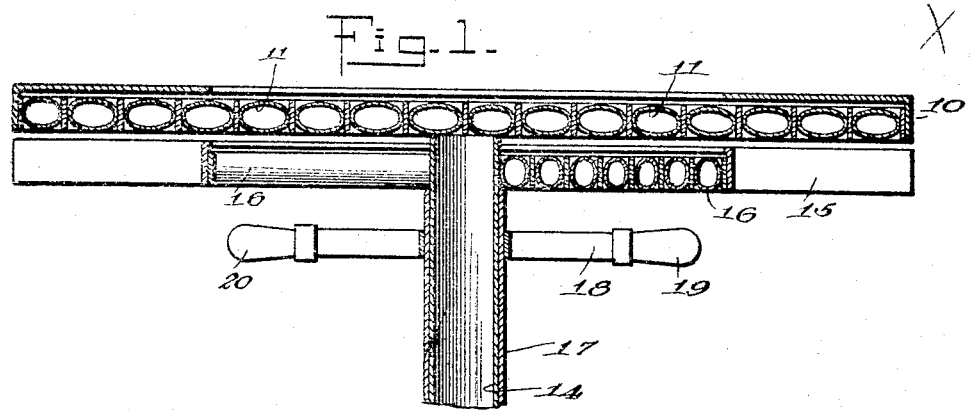
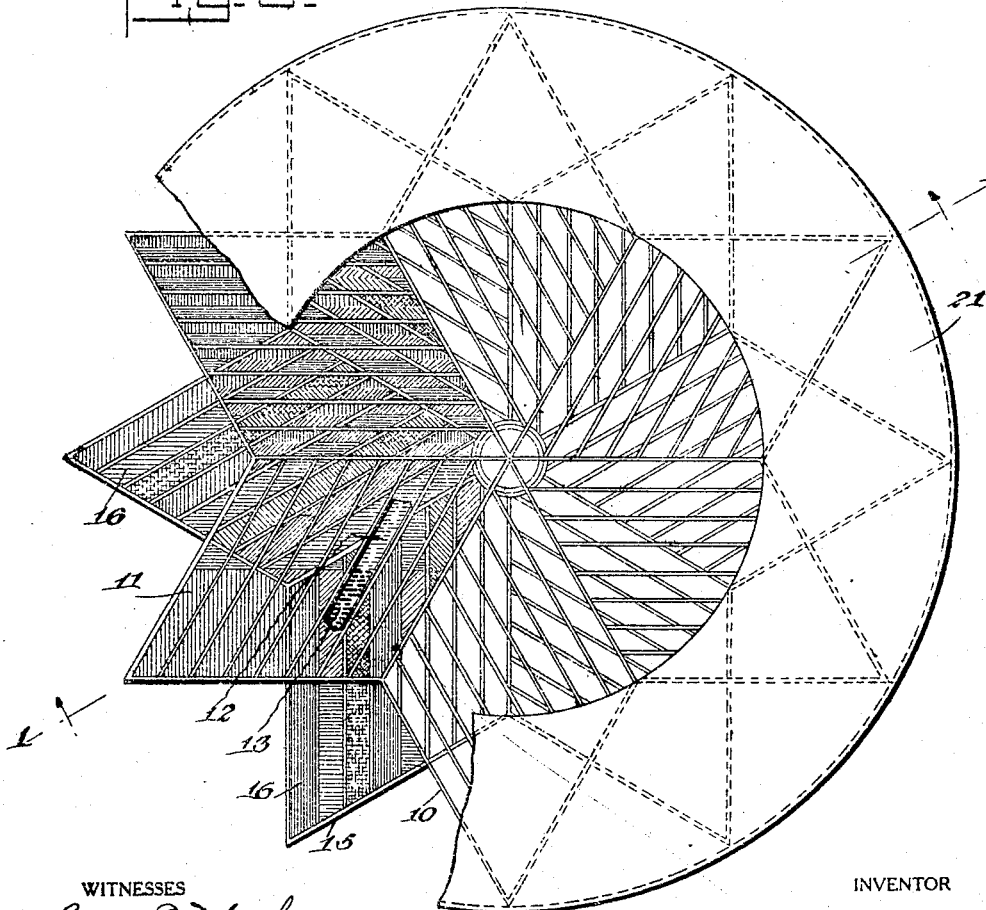
WITNESSES
INVENTOR
Stanislawa M. Bielecki,
BY
ATTORNEYS Patented July 20, 1926.

1,593,419

UNITED STATES PATENT OFFICE.

STANISLAWA M. BIELECKI, OF NEW YORK, N. Y.

OPTICAL DEVICE.

Application filed August 7, 1923. Serial No. 656,277.

This invention relates to a new and useful improvement in optical devices, and especially those which are adapted for use in advertising in color.

An object of the invention is to provide a simple, efficient and highly effective device which is economical to operate and yet which will attract instant attention wherever it is located.

Another object of the invention concerns the provision of means whereby the operation of the optical device will produce exceedingly harmonious color schemes as a source of attraction to any particular location.

The invention is illustrated in the drawings, of which—

Figure 1 is a sectional view taken along the line 1—1 of Figure 2.

Figure 2 is a front view in elevation of the device with parts broken away to show means for producing the color scheme.

The invention as generally considered comprises the movement of two or more layers of material with relation to each other, each layer being composed of designs in colors, preferably primary colors, so that in the relative movement of the one design with respect to the other these primary colors will be intermixed to produce secondary and tertiary colors in the design, these blending of colors taking place uniformly and accurately throughout the movement so that extremely harmonious effects are produced which will pleasantly and emphatically attract the attention of observers. The various layers may be hollow and provided with compartments in which colored fluid is disposed in accordance with any desired design. The movement of the layers may take place in any desired manner. As observable in one form of the apparatus, if one of the layers is provided with a plurality of hollow frames, each of which is filled with one or more colored fluids, then a rotation of this form of apparatus with relation to another layer of colored design will not only cause the blending of the colors in the manner above recited but will cause the rearrangement of the colors in each compartment, due to the action of gravity as the layer with compartments rotates.

In Fig. 1 there is shown a frame 10 which is provided with sections in which a plurality of tubes 11 of transparent material such as glass are mounted. These tubes are adapted to be filled with one or more liquids, preferably at least two, such as 12 and 13, each liquid being of different color. This frame is disposed on a rotatable shaft 14 and is movable with respect to a frame 15 containing a plurality of sections of colored material, such as glass tubes 16 also filled with colored liquids. This frame may be disposed in front of or to the rear of the frame supporting the tubes containing liquid. Preferably the frame is mounted on a stationary shaft 17 on which is also mounted a frame 18 supporting illuminating elements such as 19 and 20 so that when viewed from the front the effect observable is caused by the intermingling of the colors of the liquids in the tubes in frame 10 with the colors in the tube 16 in frame 15 lying with relation thereto at any particular instant. A shield such as 21 is disposed over the front of the frame supporting the tubes, especially along the peripheral edges thereof, so that only the central portion of the tube frame is observable.

It will be observed that if the colored liquids in each tube are of different specific gravities, as it is intended that they shall be in most cases, then as the frame 10 rotates, especially in a vertical plane, gravity will cause these liquids to assume constantly varying positions in the tubes, and this variation, combined with the natural variation of the frame and its naturally relative variation with respect to the colored tubes of frame 15, will cause constantly changing color schemes to be produced, and when observable from the front the effect of the light passing through these two colored media will produce an exceedingly harmonious and, at the same time, attractive effect. It will be appreciated that the tubes 11 and 16 may be made of solid colored glass instead of tubular members filled with colored fluid and substantially the same results will be obtained with this construction, with the exception that where the tubes are filled with liquids of different specific gravities a greater variation in the effect of the coloring will be had.

What I claim is:—

1. An optical device for advertising purposes comprising a frame having a plurality of tubular elements of transparent material such as glass arranged in the frame, a second frame disposed adjacent the first mentioned frame and likewise provided with a plurality of tubular elements of transparent material such as glass, means for causing rotation of the first mentioned frame relative to the second frame, said tubular elements being provided with colored fluids so that when the first mentioned frame is revolved the colors will be caused to be intermingled and produce a variable refraction of light as said light is transmitted therethrough.

2. An optical device for advertising purposes comprising a frame, a plurality of cylindrical elements of varying colors arranged in the frame, a second frame spaced from the first mentioned frame and provided with a plurality of cylindrical elements of varying colors, and illuminating means adjacent one of the frames, and means for rotating one of the frames relative to the other frame.

3. An optical device for advertising purposes comprising a frame formed of a plurality of compartments arranged around the center of said frame, a plurality of tubular elements of transparent material disposed at each compartment, means for rotating the frame, a second frame adapted to be held stationary with respect to the first mentioned frame and provided with a plurality of compartments with each compartment being supplied with a plurality of tubular elements of transparent material, said tubular elements in both frames being filled with a colored liquid, the colors of the liquid of the tubes in each compartment being different from the liquids in the tubular elements of the other compartments whereby when the rotatably mounted frame is revolved the colors will be caused to intermingle and produce a variable refraction of the light as said light is transmitted through the liquids.

4. An optical device for advertising purposes comprising a frame formed of a plurality of compartments arranged around the center of said frame, a plurality of tubular elements of transparent material disposed at each compartment, means for rotating the frame, a second frame adapted to be held stationary with respect to the first mentioned frame and provided with a plurality of compartments with each compartment being supplied with a plurality of tubular elements of transparent material, said tubular elements in both frames being filled with a colored liquid, the colors of the liquid of the tubes in each compartment being different from the liquids in the tubular elements of the other compartments whereby when the rotatably mounted frame is revolved the colors will be caused to intermingle and produce a variable refraction of the light as said light is transmitted through the liquids, a series of tubular members in one compartment being arranged at an angle to the tubular members in an adjacent compartment, the tubular members in each compartment being disposed in parallel relation with a radii, the radius passing along one edge of the compartment in which the tubular members are disposed.

STANISLAWA M. BIELECKI.